US006737823B2

(12) United States Patent
Reed et al.

(10) Patent No.: US 6,737,823 B2
(45) Date of Patent: *May 18, 2004

(54) DOOR OPERATOR CONTROL SYSTEM AND METHOD

(75) Inventors: Brett A. Reed, Alliance, OH (US); Robert E. Balli, Akron, OH (US)

(73) Assignee: Overhead Door Corporation, Dallas, TX (US)

( * ) Notice: Subject to any disclaimer, the term of this patent is extended or adjusted under 35 U.S.C. 154(b) by 15 days.

This patent is subject to a terminal disclaimer.

(21) Appl. No.: 10/017,051

(22) Filed: Dec. 13, 2001

(65) Prior Publication Data

US 2002/0153854 A1 Oct. 24, 2002

Related U.S. Application Data

(63) Continuation of application No. 09/567,215, filed on May 9, 2000, now Pat. No. 6,388,412.

(51) Int. Cl.[7] .................................................. G05B 5/00

(52) U.S. Cl. ....................... 318/466; 318/280; 318/282; 318/286; 318/461; 318/366; 318/468; 49/26; 49/28; 49/360; 49/279; 49/280

(58) Field of Search ................................ 318/280–286, 318/366, 369, 461, 466–468; 49/26, 28, 360, 279–280

(56) References Cited

U.S. PATENT DOCUMENTS

| | | | | | |
|---|---|---|---|---|---|
| 4,353,022 | A | | 10/1982 | Young | |
| 4,401,929 | A | * | 8/1983 | Odaka et al. | 318/466 |
| 4,408,146 | A | | 10/1983 | Beckerman | |
| 4,429,264 | A | | 1/1984 | Richmond | |
| 4,498,033 | A | | 2/1985 | Aihara et al. | |
| 4,501,090 | A | * | 2/1985 | Yoshida et al. | 49/264 |
| 4,583,081 | A | | 4/1986 | Schmitz | |
| 4,625,291 | A | | 11/1986 | Hormann | |
| 4,638,433 | A | | 1/1987 | Schindler | |
| 4,887,205 | A | | 12/1989 | Chou | |
| 4,922,168 | A | * | 5/1990 | Waggamon et al. | 318/286 |
| 4,994,724 | A | | 2/1991 | Hsu | |
| 5,081,403 | A | | 1/1992 | Matsuura et al. | |
| 5,625,266 | A | * | 4/1997 | Stark | 318/466 |
| 5,633,778 | A | | 5/1997 | Chang et al. | |
| 5,684,372 | A | | 11/1997 | Fitzgibbon et al. | |
| 5,780,987 | A | | 7/1998 | Fitzgibbon et al. | |
| 5,812,391 | A | | 9/1998 | Mehalshick | |
| 5,841,253 | A | | 11/1998 | Fitzgibbon et al. | |
| 5,998,950 | A | | 12/1999 | Fitzgibbon et al. | |
| 6,014,307 | A | * | 1/2000 | Crimmins | 361/170 |
| 6,081,088 | A | * | 6/2000 | Ishihara et al. | 318/466 |
| 6,091,217 | A | | 7/2000 | Parasdayan | |
| 6,118,243 | A | * | 9/2000 | Reed et al. | 318/468 |
| 6,184,641 | B1 | | 2/2001 | Crimmins et al. | |
| 6,388,412 | B1 | * | 5/2002 | Reed et al. | 318/466 |
| 6,425,206 | B1 | * | 7/2002 | Noda et al. | 49/360 |

* cited by examiner

*Primary Examiner*—Rina Duda
(74) *Attorney, Agent, or Firm*—Gardere Wynne Sewell LLP

(57) ABSTRACT

A control system for controlling the operation of an electric motor driven door or gate operator unit having a speed reducing gear drive mechanism and a brake unit for positive braking of the motor output shaft. A programmable microcontroller is operably connected to a motor drive circuit with interlock relays to energize the drive motor for rotation in opposite directions. The motor drive circuit is interconnected with a motor watchdog circuit to effect motor shutdown if the microcontroller malfunctions and a brake release circuit to prevent motor operation unless the brake is energized. The microcontroller is operable to store door mid-stop time delay values, braking rates, a door position limit overrun signal, a door cycle count, door reversals upon receiving an obstruction detector signal and error codes associated with door operator and control system malfunctions. The brake may be controlled on a variable duty cycle to provide smooth braking action in both directions of movement of the door.

11 Claims, 10 Drawing Sheets

201
J1
U2
U4
U5
LIMITS
J4
+5V
+24V

DOOR OPERATOR CONTROL SYSTEM AND METHOD

CROSS REFERENCE TO RELATED APPLICATION

This application is a continuation of U.S. patent application Ser. No. 09/567,215 filed May 9, 2000 now U.S. Pat. No. 6,388,412.

FIELD OF THE INVENTION

The present invention pertains to a control system for a motor driven door operator, primarily intended for industrial type doors, including sectional upward acting or rollup doors, gates and similar closures, and methods of controlling the door operator.

BACKGROUND

Motor operated doors particularly adapted for industrial applications desirably include motor controls which facilitate ease of operation of the door and provide for a long operating life in rigorous operating conditions. One type of door operator that has been developed for use with the present invention is operable to be driven by electric motors and may be adapted to automatically close in the event of a power failure or upon receiving a remote control signal, be manually operated to open or close and be adapted for use with motors of various power capacities and electric power sources. Still further, the operating requirements for commercial or industrial doors and gates have dictated other improvements in control systems for motor operated closures, including upward acting doors, in particular. The present invention provides certain improvements needed in this art.

SUMMARY OF THE INVENTION

The present invention provides an improved door operator control system for controlling a motor driven operator for doors, gates and upward acting doors, in particular.

In accordance with one aspect of the present invention a control system is provided which includes a programmable microcontroller and associated control circuits and is adapted for use with door operators driven by electric motors of various power capacities and power sources. The control system includes protective circuit elements to avoid damage to the control system caused by power source voltage transients, including overvoltages resulting from connection of a transformer of the wrong voltage rating, or major voltage surges such as induced by nearby lightning strikes.

In accordance with another aspect of the present invention a door operator control system is provided which includes improvements in circuitry for receiving signals indicating door travel limits, an advantageous arrangement of operator control elements for controlling a microcontroller unit of the control system and circuits for input signals from various sources including external interlock input signals and remote control input signals.

The control system of the present invention also includes circuits for connecting a microcontroller to motor drive relays or contactors including an interlock feature, a motor drive "watchdog" circuit, a motor drive status feedback circuit, control circuitry for controlling a door operator which includes an operator brake, and an emergency operator shutdown circuit.

The control system of the present invention further includes a keypad for inputting control signals and calibration signals to a microcontroller via a serial communication bus to control door functions including door overrun of a position limit, braking rate of the operator brake, a mid position stop, clearing maximum run timers of the operator and correlating the motor direction of rotation with door direction of movement. The control system further includes a seven segment display and calibration indicators for displaying a condition code in the normal operating mode of the control system, calibration information when the control system is being operated in a calibration mode and error codes indicating a fault or error condition existing in the control system and the associated operator. The seven segment display includes a driver circuit including a multiplexed constant current source.

The present invention still further provides an improved method of operating a motor driven operator for opening and closing a closure device, such as an upward acting sectional or rollup door or a gate wherein improved braking action is imposed by and on the operator to control a braking rate of the door to minimize shock loads, wear and tear on the door and the operator, and to reduce noise associated with door operation.

The control system is also adapted to provide a method of operation which allows a door position limit overrun with variable progressively longer or shorter time delays between the time that a limit position is achieved and the door operator begins a braking procedure. In particular, when the door operator activates a switch determined to be the door down position limit switch, a user selectable time delay may be input to the controller, which time delay will delay motor shutdown and the onset of the braking procedure to allow the door bottom edge to seal against a floor or sill and without activating a door reversal or so-called safety reversal switch, which would otherwise cause an unintended reversal of the door.

Those skilled in the art will further appreciate the features and advantages of the door operator control system and method of operation as well as other important aspects thereof upon reading the detailed description which follows in conjunction with the drawings.

DETAILED DESCRIPTION OF PREFERRED EMBODIMENTS

Figure 1:
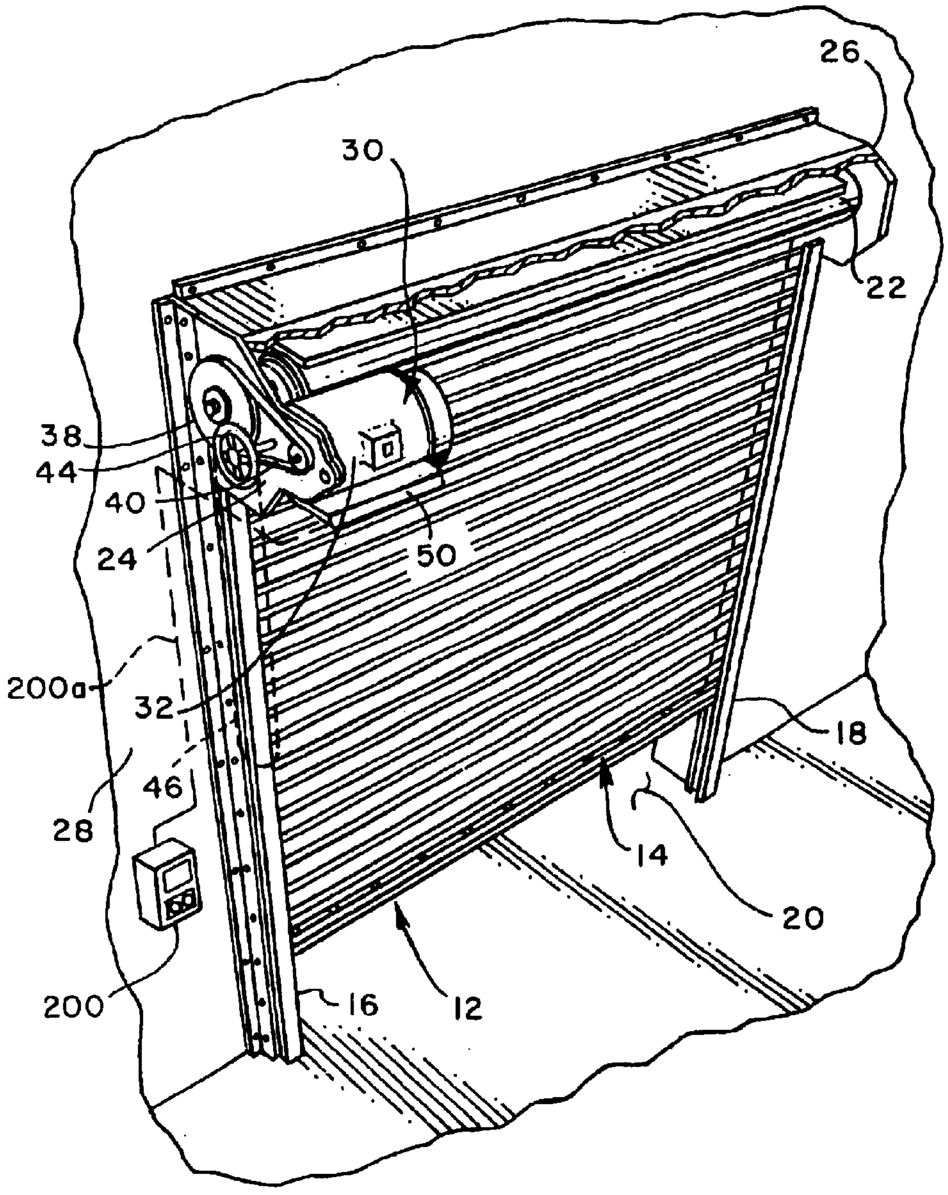
FIG. 1 is a perspective view of a door operator unit utilizing the control system of the present invention for opening and closing a vertical rollup type door.

In the description which follows, like parts are marked throughout the specification and drawing with the same reference numerals, respectively. The drawing figures may not necessarily be to scale and certain components may be shown in somewhat generalized or schematic form, using conventional symbols, in the interest of clarity and conciseness. Major circuit elements commercially available are designated in a correlation table herein.

Referring to FIG. 1, there is illustrated conventional upward acting or rollup type door 12 including a closure member 14 guided for movement between opposed vertically extending guide tracks 16 and 18 for closing a door opening 20. Upward acting door 14 is of a so-called rollup type and comprises a flexible curtain which is adapted to be wound around a cylinder or drum 22 supported for rotation between spaced apart brackets 24 and 26 suitably supported by a vertical wall 28, as shown. The drum 22 is drivenly connected to an improved door operator unit adapted to be controlled by the control systems of the invention, and generally designated by the numeral 30. The operator unit 30 includes a housing 32 adapted to be supported on the bracket 24. A rotatable output shaft 34 is supported for rotation on the housing 32 and supports a conventional drive sprocket 36 for rotation therewith and drivingly connected to a sprocket 38 connected to the drum 22 by way of a conventional endless chain or belt 40.

Figure 2:
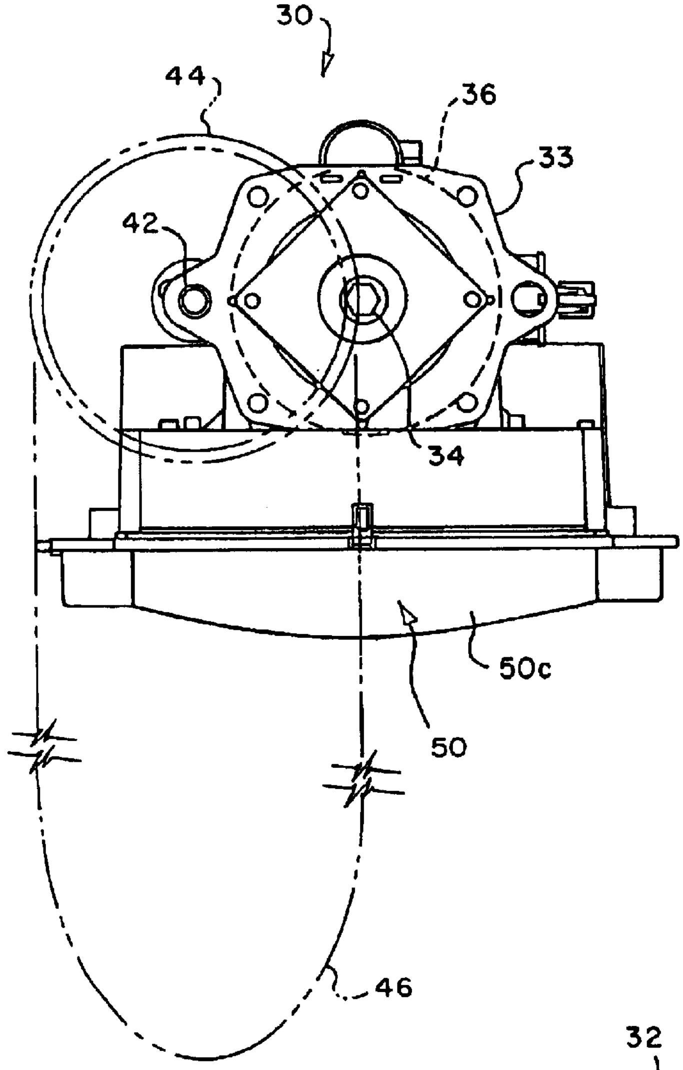
FIG. 2 is an end elevation of the operator unit shown in FIG. 1.
Figure 3:
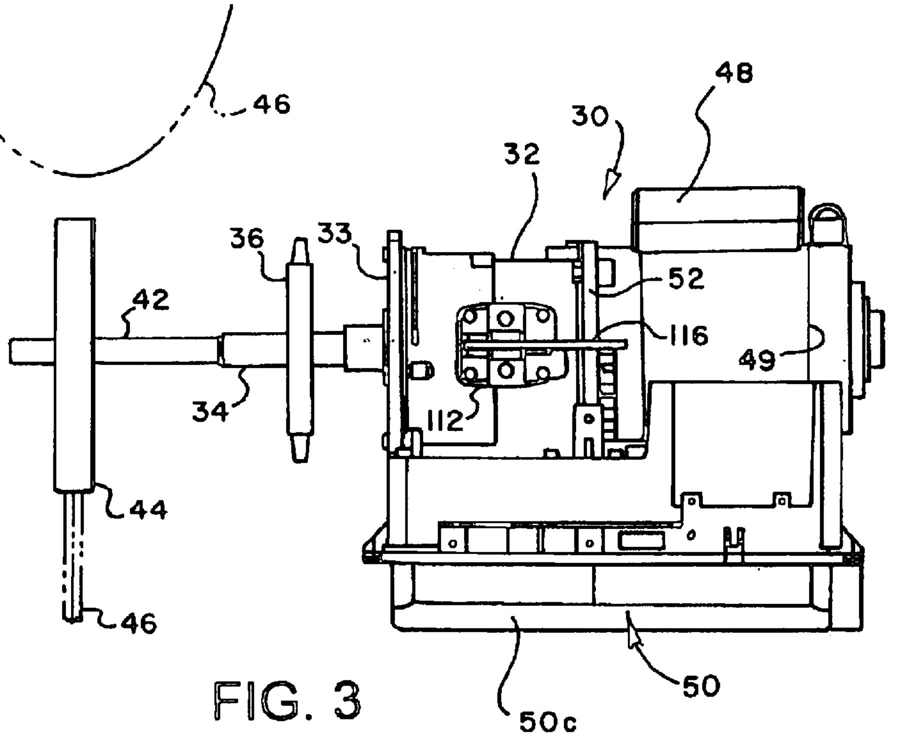
FIG. 3 is a side elevation of the operator unit shown in FIG. 1.

As shown in FIGS. 2 and 3 also, the door operator unit 30 includes an auxiliary drive shaft 42 rotatably supported on housing 32 spaced from output shaft 34 and supporting a handwheel 44 comprising a chain sprocket drivably engaged with an endless link chain 46 in a known manner for rotating shaft 42 to raise or lower the door 14, when required. Normally, in certain applications of the operator unit 30, the door 14 will lower itself under certain conditions but may be required to be raised manually by rotating the handwheel 44 via the chain 46 or by direct engagement of the handwheel by a person attempting to raise the door through the operator unit 30.

Referring further to FIGS. 2 and 3, the operator unit 30 includes an electric drive motor 48, FIG. 3, including a housing 49 directly connected to the housing 32 and operable through suitable drive mechanism, to be described further herein, to drive output shaft 34 in opposite directions of rotation under command of the control system of the present invention. Major components of the control system are mounted in a housing, generally designated by numeral 50. Housing 50 includes a removable cover 50*c* to provide access to the control system to be described further herein including a calibration keypad for the control system and a seven segment digital visual display board also associated with the control system.

The orientation of the operator unit 30 and the housing 50 therefor illustrated in FIGS. 1 through 3 is exemplary. The operator unit 30 may be mounted with the housing 50 oriented to either side of the unit or the unit 30 may be inverted so that the housing 50 is above the motor 48. A preferred orientation of the operator unit 30 is such that the housing cover 50*c* is facing either side of the operator unit to facilitate ease of removal and operation of the aforementioned calibration keypad disposed within the housing and which will be described in further detail hereinbelow. As further shown in FIGS. 2 and 3, housing 32 includes a suitable transverse mounting flange 33 for mounting the operator unit 30 on the bracket 24, for example, using conventional mechanical fasteners, not shown.

Figure 4:
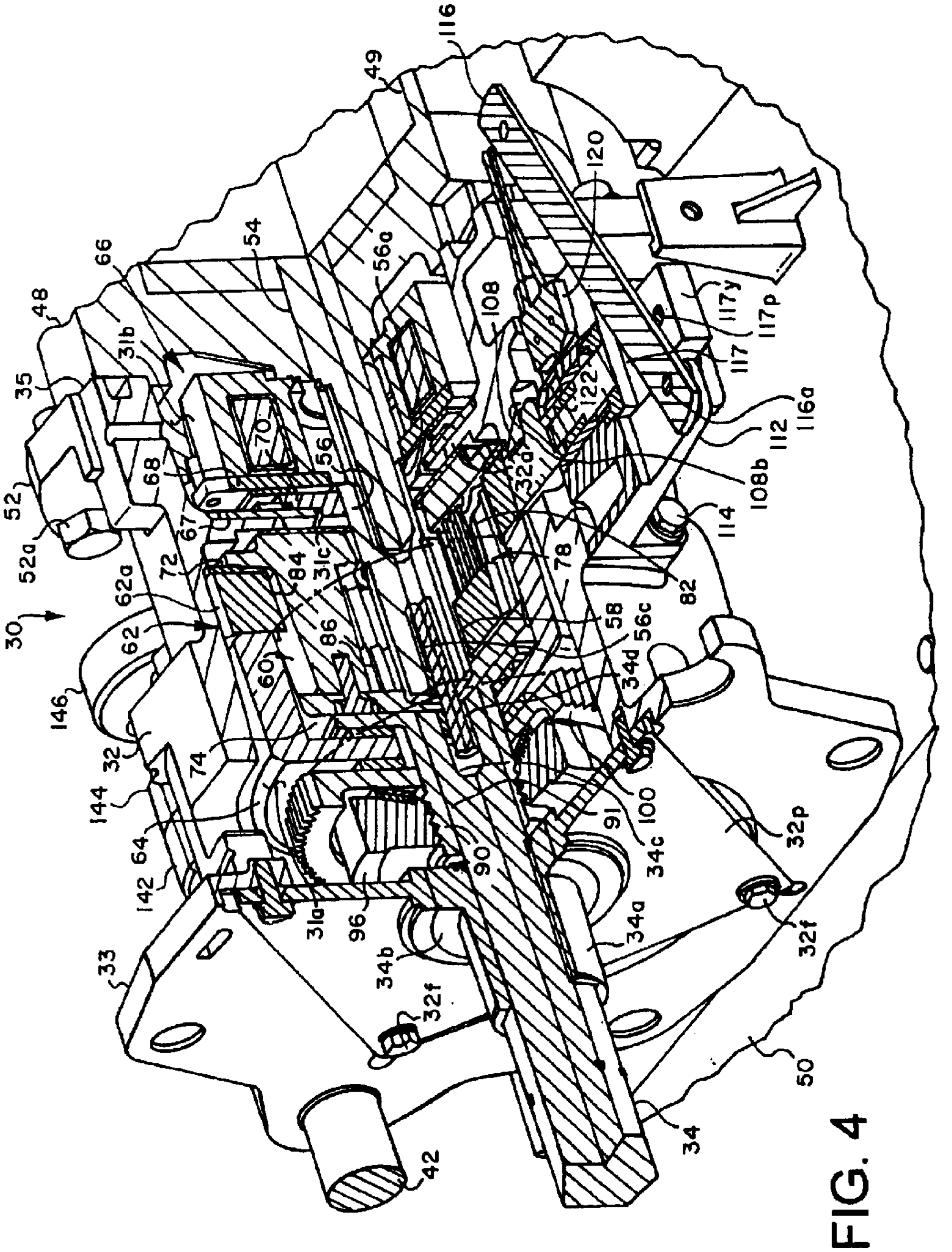
FIG. 4 is a perspective view, partially cut away, of the operator unit shown in FIGS. 1–3.

Referring now to FIG. 4, the housing 32 includes an end face 35 opposite the flange 33 and including a flange 52 for securing motor 48 in assembly with the housing 32 using fasteners 52*a*, one shown. Motor 48 may be a conventional induction type electric motor including a rotary output shaft 54 adapted to be driveably connected to a coupling member 56, including a "sun" gear 58 formed thereon. Sun gear 58 is drivingly connected to a differential planetary gear drive mechanism, generally designated by numeral 60 and disposed in a first cavity 31*a* formed in housing 32 and separated from a second cavity 31*b* by a transverse partition 32*a*. Drive mechanism 60 includes a first ring gear 62 supported in housing 32 adjacent a second ring gear 64 comprising an output gear of the planetary gear drive mechanism.

Referring to FIG. 4, output shaft 34 is disposed in sleeved relationship within a bearing hub 34*a* which is coupled to a suitable sealed bearing 34*b* supported for rotation in a support plate 32*p* releasably connected to the flange 33 by fasteners 32*f*. Moreover, shaft 34 includes a bearing bore 34*c* for receiving an idler shaft 34*d* which extends within a bore 56*c* of coupling/sun gear 56, 58 to provide support for the coupling/sun gear and to journal the coupling/sun gear against lateral deflection away from its normal axis of rotation.

A commercially available electromagnetic disc type brake assembly 66 is supported within cavity 31*b* of housing 32 by motor housing 49 and includes a stator member 68 axially movable with respect to shaft 54 and coupling member 56 but nonrotatable relative to housing 32. Brake assembly 66 may be of a type manufactured by API-Deltran, of Amherst, N.Y. as their model BRP-30Y. A brake disc member 70 is mounted on coupling member 56 for rotation therewith and is operable to be engaged by an axially movable brake assembly stator member 68 to arrest rotation of coupling 56 and motor drive shaft 54 when the brake assembly 66 is de-energized. When brake assembly 66 is energized, stator member 68 is operable to release forcible engagement with brake disc 70 to allow same to rotate with motor drive shaft 54 and coupling/sun gear 56, 58. Brake assembly 66 includes a stationary back plate 67 forming a support for limiting axial movement of the disc 70 and stator 68 and to provide for engaging the disc 70 to provide the braking action. The coupling 56 includes a portion 56*a* having a non-circular outer surface for slidably engaging a corresponding non-circular bore in brake disc 70 to provide for drivingly-connecting the disc 70 to the coupling 56 but allowing some axial sliding movement between the disc 70 and the coupling/sun gear 56, 58.

Transverse partition 32*a*, intermediate the flange 33 and the end face 35, separates the brake assembly 66 from the differential planetary drive mechanism 60. Cavity 31*a* may be at least partially filled with a suitable lubricant which is prevented from escaping into cavity 31*b* by a disc like dam 31*c*, FIG. 4. The planetary gear drive mechanism 60 includes carrier members 72 and 74 releasably connected to each other. Carrier members 72 and 74 support plural circumferentially spaced apart compound planet gears 78 for rotation on suitable shafts. An arrangement of three equally-spaced planet gears 78 is preferred. Compound planet gears 78 each include a first set of gear teeth 82 meshed with cooperating internal gear teeth 84 formed on ring gear 62 and a second set of gear teeth 86 adapted to mesh with internal teeth formed on output ring gear 64. Planet gears 78 also mesh with sun gear 58 in driven relationship thereto. Accordingly, a substantial speed-reducing, torque multiplying effect is provided by the differential planetary gear drive mechanism 60 for rotating the output shaft 34 at a reduced speed with respect to the input shaft or coupling 56 and the motor output shaft 54.

Ring gear 64 includes a transverse cylindrical disc-like hub portion and a central bore therethrough which is adapted to receive a torque limiting clutch hub 90 therein, which hub is drivingly coupled to output shaft 34. In this respect, output shaft 34 has a hexagonal cross-section and is drivenly coupled to hub 90 which has a cooperating hexagonal cross section bore 91 formed therein. Clutch hub 90 is also provided with external threads formed thereon for threadedly connecting the hub to a torque limiting clutch adjustment plate 96 having cooperating internal threads.

If driving torque imposed on ring gear 64 exceeds a limit set by the torque limiting clutch described, the ring gear 64 will slip with respect to the hub 90, rotationally, to prevent damage to the operator unit 30 as well as other structural components including the drive mechanism between the operator unit and the door closure member 14 and any object which may be caught between the door closure member and the floor of the door opening. However, since limit switch gear 100 is keyed for rotation with clutch hub 90, and clutch hub 90 is positively engaged with shaft 34, any slippage of the aforementioned clutch will not result in a loss of timing between a limit switch operably connected to the gear 100 and the position of a door driven by the operator unit 30. By way of example, gear 100 is meshed with a pinion, not shown, which is operable connected to a suitable door position limit switch of a type commercially available from Sanwa Corporation, as Hokuyo model LMP-2, for example.

Ring gear 62 has a set of circumferential external teeth 62*a* formed thereon which are adapted to mesh with a ring gear release block 108. In this way, when ring gear 62 is held stationary with respect to housing 32, rotation of motor shaft 54 and coupling/sun gear 56, 58 will effect rotation of ring gear 64 and output shaft 34 at a predetermined reduced speed with respect to shaft 54.

Accordingly, with brake assembly 66 applied to prevent rotation of motor output shaft 54, operator unit output shaft 34 is also braked against rotation when ring gear 62 is held stationary with respect to housing 32. However, ring gear release block 108 is operable to move out of engagement with ring gear 62 to allow same to rotate freely. Under these conditions, output shaft 34, ring gear 64 and planet gears 78 will rotate together with ring gear 62 even though shaft 54 and coupling/sun gear 56, 58 are held stationary by the brake assembly 66.

Referring further to FIG. 4, ring gear release block 108 is supported in a removable housing 112 secured to the housing 32 by spaced apart fasteners 114, one shown. An elongated lever 116 is pivotally connected to the housing 112 by pivot pin 116*a* and is engageable with an adapter member 117 for moving the release block 108 radially away from engagement with the ring gear 62. A lever actuated switch 120, FIG. 4, includes a lever actuator 122 engageable with a tang 108*b* formed on the release block 108.

Accordingly, beginning with the condition wherein the block 108 is engaged with ring gear 62, a first actuation of the handle 116 will effect disengagement of the block 108 from the ring gear 62 and a holding of the block in the disengaged position. Upon a second actuation of the handle 116 and release thereof, the block 108 will re-engage the ring gear 62 holding same against rotation with respect to housing 32.

Under circumstances wherein the brake assembly 66 remains engaged to prevent rotation of shaft 34, coupling/sun gear 56, 58 and the output shaft 34, the output shaft may be allowed to rotate together with all of the elements of the differential planetary gear drive mechanism, except the sun gear 58, on actuation of the release block 108 to disengage from the ring gear 62. This disengagement of the release block 108 from the ring gear 62 may take place manually upon manual actuation of the handle or lever 116 or in response to a control signal applied to an actuator, not shown, suitably connected to the lever. Switch 120 may, of course, be associated with the control system for the operator 30 to maintain a count of the number of actuations of the lever 116 and to indicate the condition of the operator, that is, whether or not the ring gear 62 has been released and allowed to rotate.

A control system, as shown in FIGS. 5A–5G, is disposed, substantially, in housing 50 except for a wall mounted unit indicated by numeral 200 in FIG. 1, which includes one or more control switches, to be described, operably connected to the control circuit in housing 50 by suitable electrical conductor means 200*a* or other interface means, not shown.

Figure 5A:
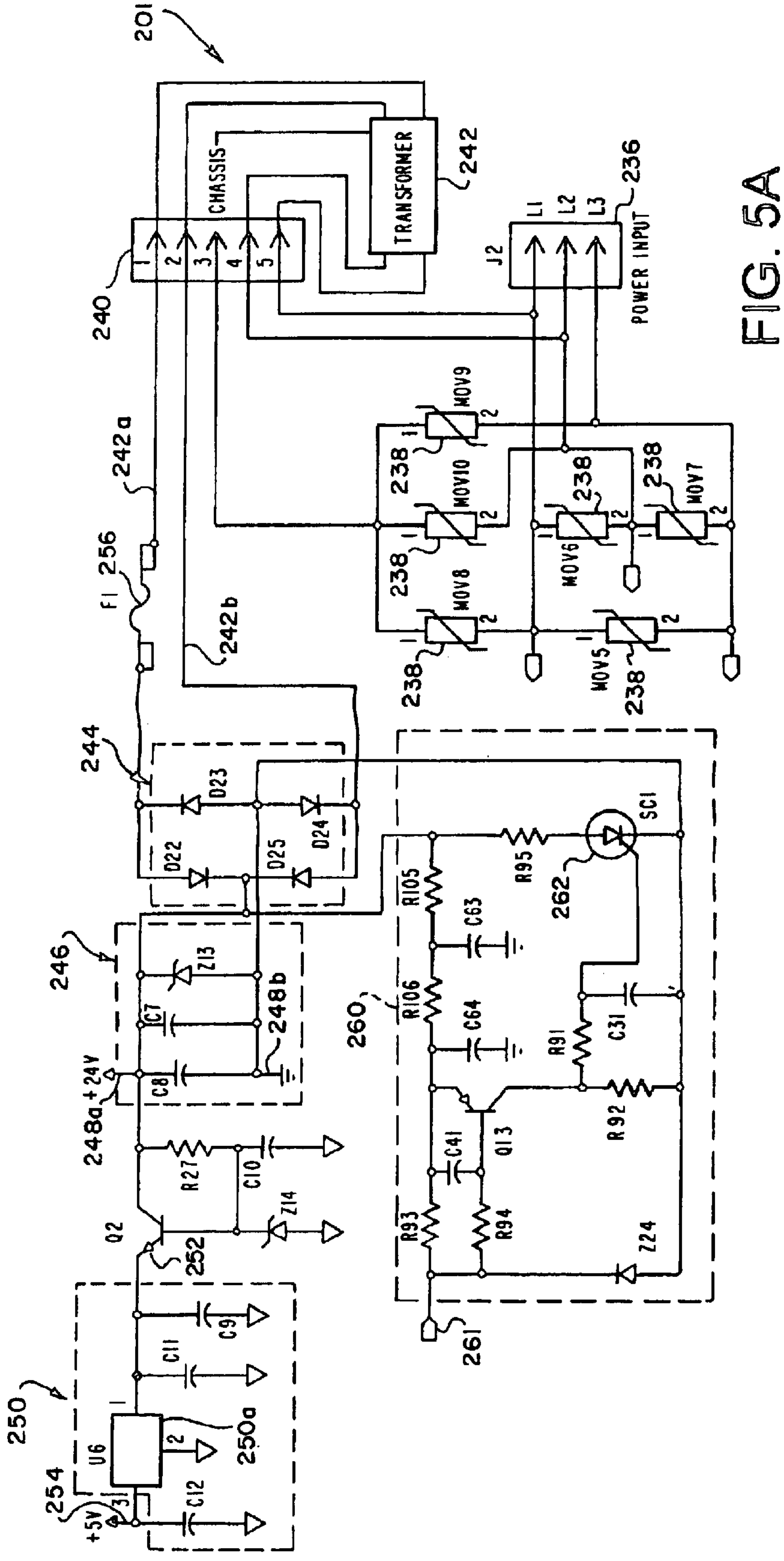
FIGS. 5A through 5G comprise a circuit diagram of the control system of the present invention.
Figure 5B:
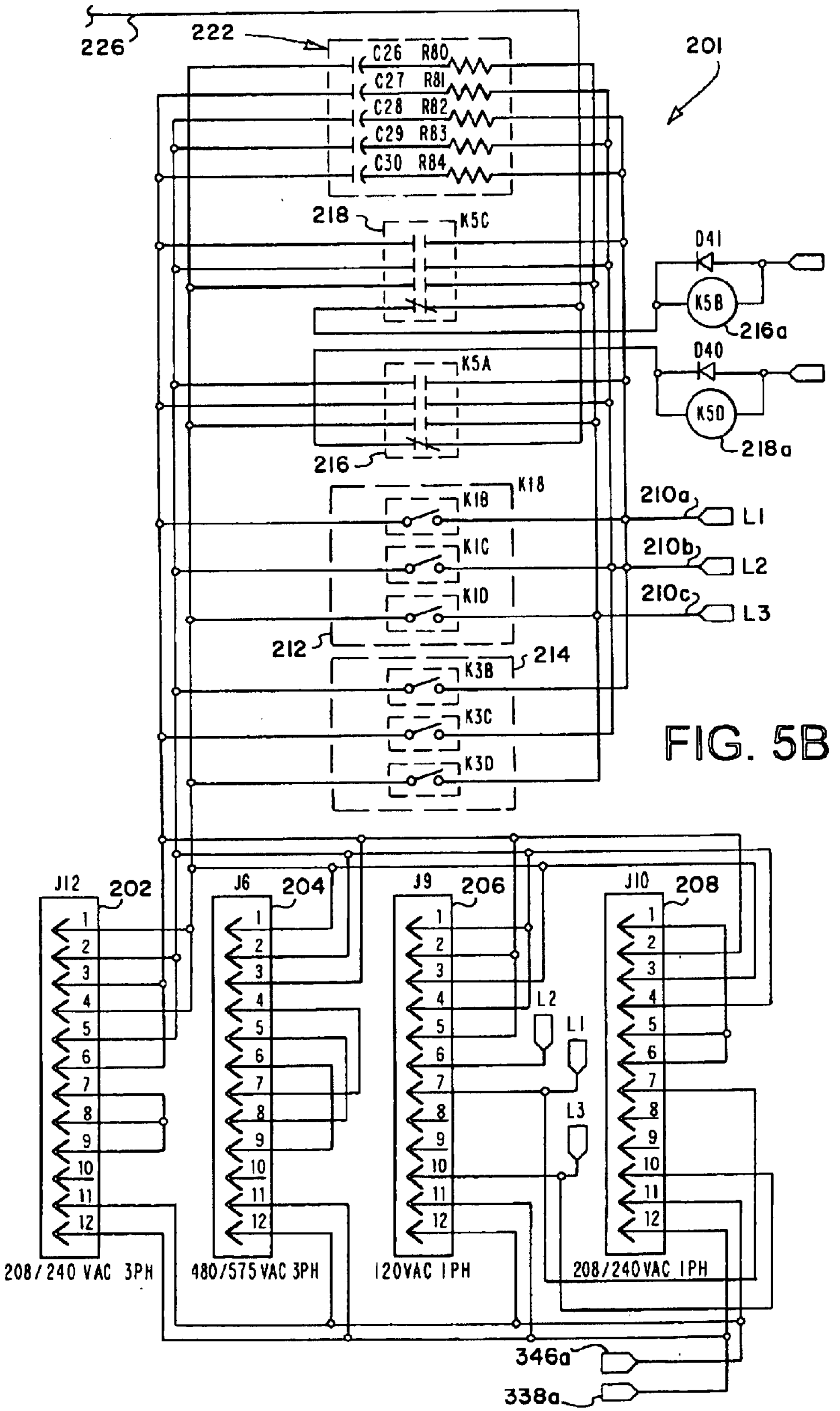

Referring now to FIG. 5B, there is illustrated a diagram comprising part of a control system 201 of the invention, including suitable multi-pin connectors 202, 204, 206 and 208 for connecting line voltage and a motor thermal protector feedback signal to motor 48, depending on the voltage and phase of a power source, not shown, and adapted to be connected to the control system. The control system of the present invention is adapted to connect the operator drive motor with a selected one of sources of line voltage and phase characteristics, as indicated by the motor power supply control circuit of FIG. 5B, depending on motor characteristics and power availability. Accordingly, when a particular voltage and phase condition has been selected the appropriate connector 202, 204, 206 or 208 is utilized with the motor 48. For purposes of discussion hereinbelow, primarily, the control system will be described for that situation wherein relay contacts 212 and 214 are used in conjunction with the motor and the control system.

Figure 5C:
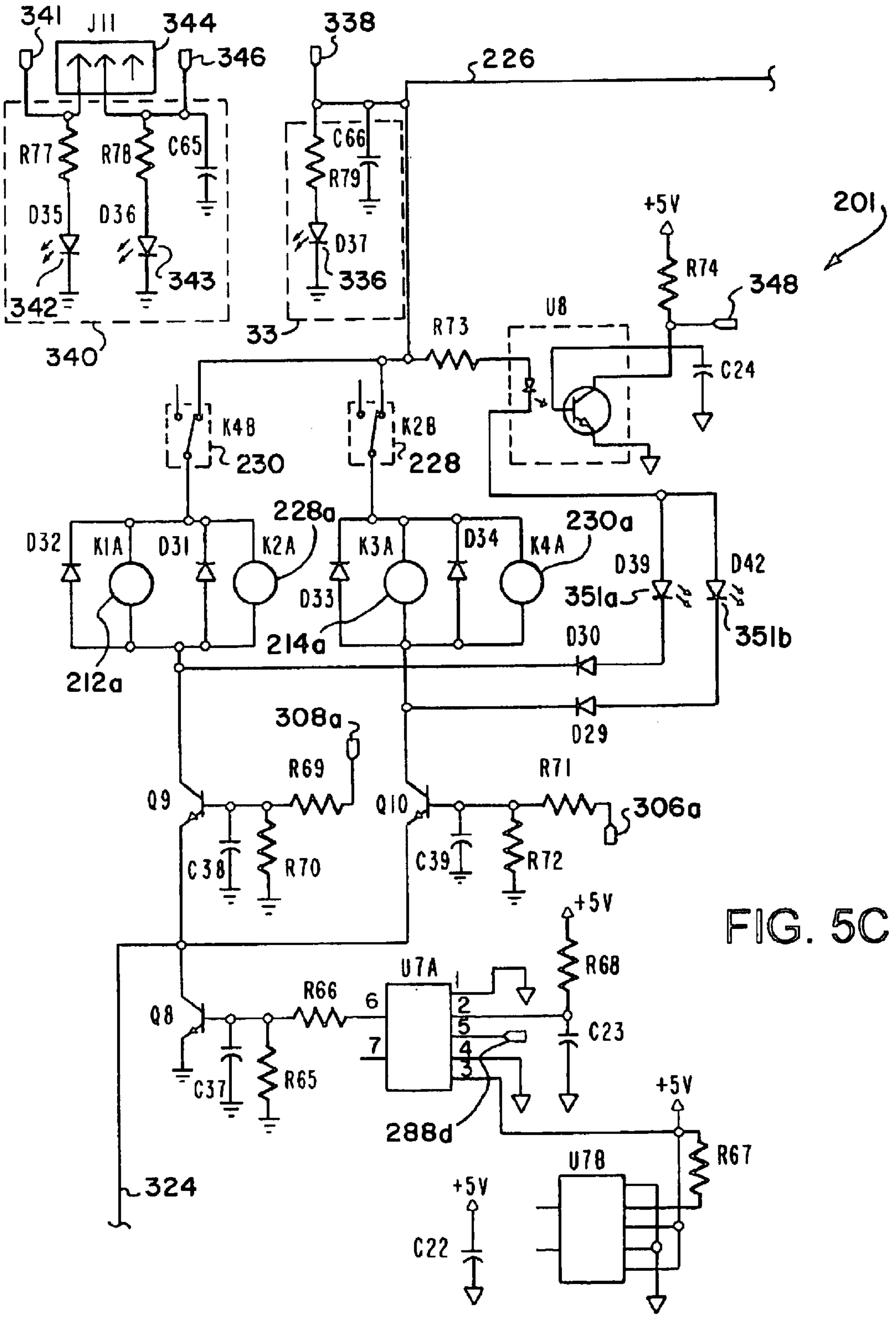

Conductors 210*a*–210*c* are connected to the appropriate connectors 202, 204, 206 and 208 by way of relay contact sets 212 and 214 or contactors, 216 and 218, as shown. Actuators or coils for relay contacts 212 and 214 are illustrated in FIG. 5C, are part of a motor drive circuit therein shown and are designated by numerals 212*a* and 214*a*. A suitable resistor-capacitor transient protection circuit 222, FIG. 5B, is operable to reduce any electrical arcing which might occur at the contacts 212 or 214 or contactors 216 or 218, respectively.

FIG. 5B also illustrates relay coils 216*a* and 218*a* operably connected to relay contactor sets 216 and 218 and to a control circuit conductor 226 which is connected to control circuitry shown in FIG. 5C. When relays 212 and 214 are used, interlock relays 228 and 230 are controlled by respective actuators 228*a* and 230*a*, as shown in FIG. 5C. As indicated in FIG. 5B, motors operating on 208/240 VAC 3 phase, 480/575 VAC 3 phase, 120 VAC 1 phase or 208/240 VAC 1 phase may be used in conjunction with the control system of the invention. Thanks to the configuration of the circuit shown in FIG. 5B and the control circuits associated therewith and described herein, a control system is provided which is substantially universal within the parameters of power supply voltage and phase conditions indicated.

Referring to FIG. 5A, the control system 201 includes a connector 236 adapted to connect the control system to the line voltage available on conductors 210*a*, 210*b* and 210*c*. Conductors connected to the connector 236 are also connected to an array of metal oxide varistors 238 interconnected, as illustrated in FIG. 5A, across each of the power input conductors and between each conductor and earth ground to further protect the control system 201 from damage by power line transient conditions.

A connector 240 provides for connecting the control system 201 to a suitable transformer 242, preferably a 24 VAC 40 VA, Class 2 transformer with a primary voltage matched to the power supply line voltage supplied to the control system. Transformer 242 is thus preferably connected by way of connector 240 to a circuit board, not shown, on which the control elements indicated herein are mounted. Transformer output or secondary conductors 242*a* and 242*b* are connected to a bridge rectifier circuit 244 and appropriate capacitor filters, and transient protection components, indicated generally at 246 to supply 24 VDC power output at conductors 248*a* and 248*b*. A 5 VDC regulated power supply circuit 250, including a voltage regulator 250*a* is connected to the 24 VDC power circuit by way of transistor 252 (Q2) to provide a pre-regulation function. Regulated 5 VDC power is available at conductor 254. A fuse 256 is interposed in conductor 242*a* to protect the associated circuits and transformer secondary circuit for the transformer 242.

As further shown in FIG. 5A, a voltage sensing circuit 260 is connected across the rectifier circuit 244 and is operable to apply a short circuit across the 24 VDC power supply provided by the rectifier circuit, if the DC supply voltage should vary by a preset amount, thus causing fuse 256 to open and protect the control system from damage due to overvoltage. For example, if a transformer is connected to the control circuit of the wrong voltage rating or if major power line surges, such as those caused by nearby lightning strikes, are experienced, fuse 256 will open to protect the control system elements connected to the DC power supply rectifier bridge 244.

Throughout the schematic diagrams of FIGS. 5A through 5G, several schematic reference symbols are shown for purposes of eliminating an excessive number of lines to indicate a conductive or signal transmission path. By way of example, in FIG. 5A, schematic reference or symbol 261 indicates a point at which a signal may be imposed on sensing circuit 260 to effect turning on a silicon controlled rectifier (SCR) 262 thereby creating a short circuit which will effect opening of fuse 256 when, for example, an emergency shutdown of the control system 201 is desired. Throughout the discussion herein and the drawing figures referred to in such discussion, the term "schematic reference" or "reference" will be used to indicate a so-called connector or point on a conductive path at which signals may be transmitted to or received from other points or control elements of the control system of the invention without showing a line therebetween.

Figure 5D:
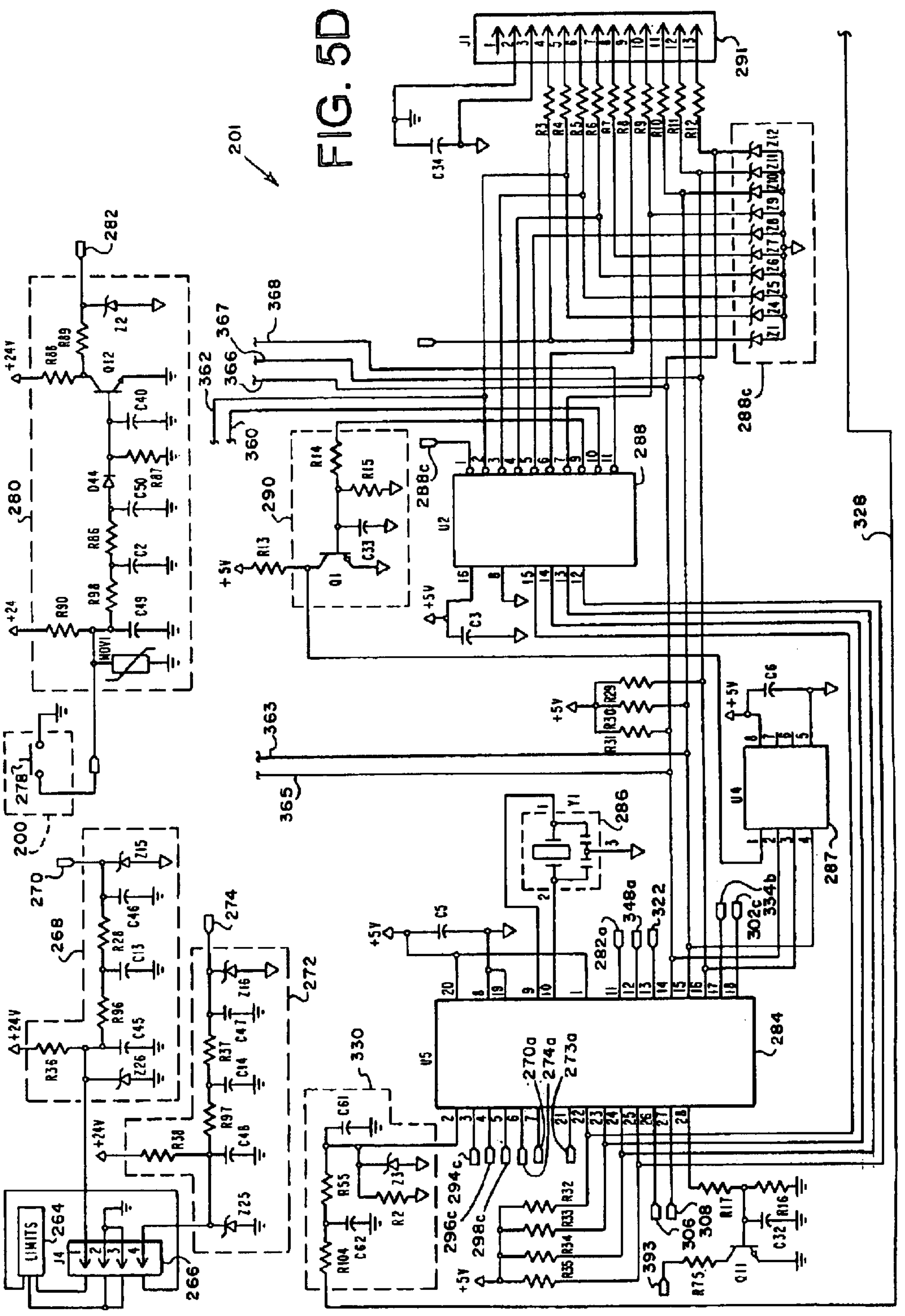

Referring now to FIG. 5D, door travel limit indicator means comprising a switch unit 264, may be associated with a door, such as the door 14, FIG. 1, and operably connected to the operator unit 30, as previously discussed, for providing suitable signals indicating when the door has reached an open or upper limit position and a closed or down limit position. These limit positions may be associated with a so-called clockwise (CW) and counterclockwise (CCW) direction of rotation of the door drum 22, for example, or the output shaft 34 of the operator 30 and correspond to a clockwise or counterclockwise direction of rotation of the motor 48. In all events, a signal indicating a position limit may be provided by limit switch unit 264 through a connector 266 to a conditioning circuit 268 for providing an output signal at schematic reference 270. In like manner a signal from the limit switch unit 264 may be imposed through connector 266 on a second signal conditioning circuit 272 for output to schematic reference 274. The "up" or door open and "down" or door close mode of operation associated with each limit switch signal may be selected by a user when calibrating the control system 201.

In the exemplary embodiment shown, the actual limit switches in the limit switch unit 264 are configured as normally closed switches which operate to provide suitable control signals through the respective signal conditioning circuits 268 and 272. Limit switch unit 264 may be of the type commercially available referenced hereinabove. A microcontroller unit associated with the control system and described hereinbelow will monitor the appropriate limit signal and when a limit signal is received the microcontroller is operable to stop the motor 48 and begin a braking cycle, applying the brake 66 to stop rotation of shaft 54 and output shaft 34 in a desired manner. Moreover, a user selectable time delay may be used in conjunction with control system 201, as will be described further herein for the situation where the motor shutoff signal is received when either position of the door is reached. When the aforementioned time delay is completed the motor 48 is shutdown and the braking process begins. In particular, a door "down" or closed limit overrun feature is provided whereby the control system 201 permits a door having flexible door bottom edge seal or gasket to engage the floor without causing an unintended reversal of the door.

Still further, the aforementioned microcontroller also utilizes the limit switch input signals generated at the references 270 and 274 to monitor the limit position of the door opposite the direction of rotation of the motor. For example, if the motor 48 causes the operator unit 30 to move the door away from a limit position and the operator output shaft is running in a clockwise direction the controller will monitor the other (counterclockwise) limit for a signal. If the monitored limit does not respond within a short time of motor activation, the microcontroller will determine that a motor stall condition has occurred. The microcontroller will then effect shutoff of the motor and begin the braking process followed by displaying a suitable error code in a manner to be described further herein.

Referring further to FIG. 5D, the control system 201 may be operable to include only one user or operator controlled switch at the control unit 200. This switch is indicated at 278 in FIG. 5D and is associated with a signal conditioning circuit 280 to provide an output signal at schematic reference 282. Operation of the switch 278 will effect operation of the motor 48, and release of the brake 66, to move the door 14 to the up or open position unless the door is already in that position, in which case the door will move to the opposite or closed position.

Referring still further to FIG. 5D, the control system 201 includes a programmable microprocessor, or so called microcontroller, previously mentioned, and generally designated by numeral 284, which is operable to receive certain control signals and to generate other control signals to control operation of the operator 30 including the steps described hereinabove. The microcontroller 284 may be of a type commercially available, such as a model PIC16C73B available from Microchip Technologies, Inc. The microcontroller 284 is preferably an 8-bit CMOS device including a serial communication port, a random access memory (RAM) and a programmable, read-only memory. The microcontroller 284 is controlled by a suitable oscillator 286 for operation at a clock frequency of 10 MHz.

Microcontroller 284 is connected to a non-volatile memory comprising a serial EEPROM 287 connected to the microcontroller through the serial communication port and is operably connected to a decoder integrated circuit 288 which enables the memory 287 by way of a circuit 290. Information stored in memory 287 includes information for maximum operator run time timing values and calibration data including indication of the down direction of the door 14, a door mid-stop time delay value, a braking rate index value, timing data related to the braking function, a door position limit overrun index value, a door operating cycle count, information associated with plural error codes generated by the control system, a door halt timing index value, the total number of safety sensor activated door motion reversals, where applicable, and flags indicating whether the following options are active: a timer controlled closing of the door with a wall control signal, a timer controlled closing of the door with a radio control signal, a timer controlled closing of the door with an auxiliary input signal, a photocell type sensor, a failsafe edge sensor, a normally closed safety input signal and open and close modes initiated by a wall control switch, either momentary or constant contact. The microcontroller 284 may be programmed, for example, to require constant contact or momentary contact of a one button control switch to open and close the door in combination with automatic stop or reverse (opening) of the door when operating in the constant contact mode. The microcontroller 284 is also operable to maintain or save data related to the relationship between the door down position limit switch signal and the braking of the door, and save data and initiate a reversal or opening of the door if operation of the microcontroller is disrupted.

The communication decoder circuit 288 is preferably a commercially available unit as indicated in a correlation table hereinbelow. The decoder 288 is a one of ten type decoder and receives a 4-bit code from the microcontroller 284 and activates an output signal based on the code. The outputs generated by decoder 288 are used to activate a motor drive watchdog circuit, the non-volatile memory 287, a calibration keypad input circuit and a display driver circuit to be described herein and any options available through a system expansion port. Microcontroller 284 and decoder 288 are connected to a suitable connector 291 via signal conditioning circuits 288*c* for connecting the microcontroller to a serial peripheral interface and for selected external or auxiliary device inputs. The serial peripheral interface is connected to connector 291 at contacts SDI, SDO and SCLK, as indicated. An external diagnostic device or "pod", not shown, may also be connected to control system 201 at connector 291.

Figure 5E:
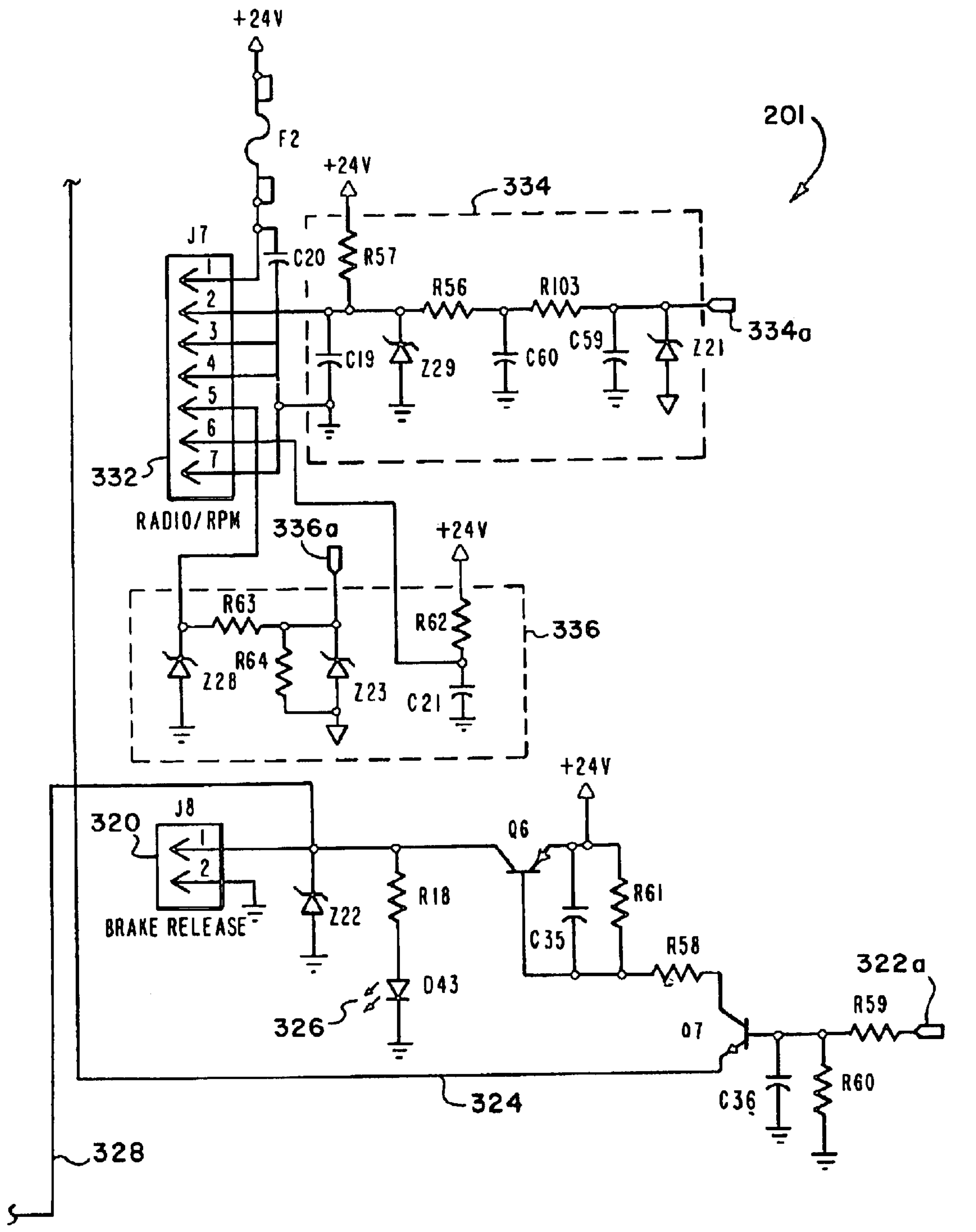
Figure 5F:
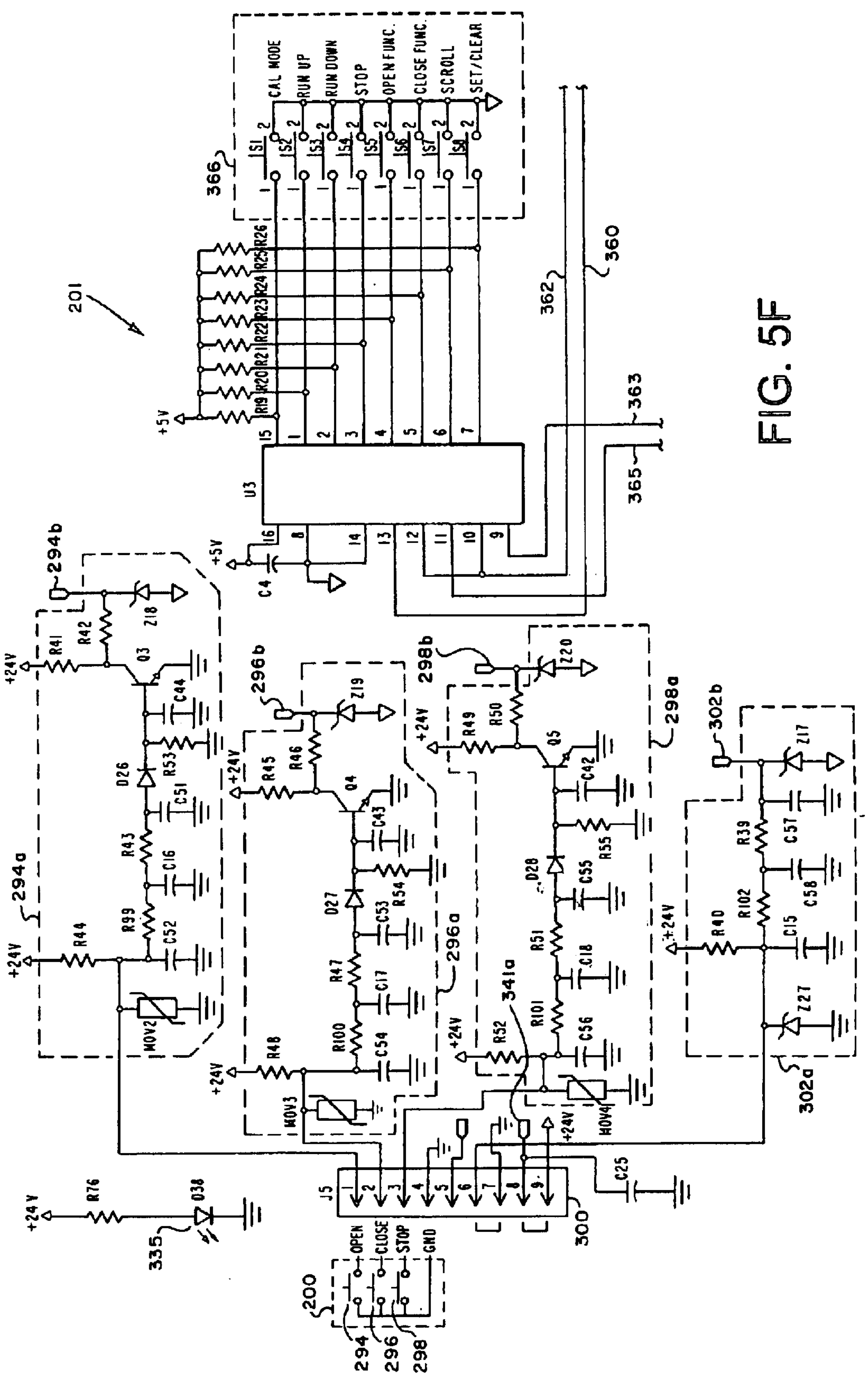

Referring now to FIG. 5F, wall control unit 200 may, alternatively, include momentary push button switches 294 and 296 for controlling the operator 30 to open and close the door 14, respectively, and a switch 298 for stopping operation of the door. The switches 294, 296 and 298 are appropriately connected to the control system 201 through a connector 300 and respective signal conditioning circuits 294*a*, 296*a* and 298*a*, respectively.

Output signals from the respective circuits 294*a*, 296*a* and 298*a* are available at schematic references 294*b*, 296*b* and 298*b*, respectively. A door "reverse" input signal may be applied through connector 300 from a suitable door bottom edge sensor, not shown, or obstruction detector, also not shown, which signal is applied through a signal conditioning circuit 302*a*, FIG. 5F, to schematic reference 302*b*.

Referring again to FIG. 5D, references 294*c*, 296*c*, 298*c* and 302*c* are operable to receive suitable signals associated with operation of the push button switches 294, 296, 298 and the aforementioned door reversed signal which could be received from a door edge sensor or obstruction detector associated with the door 14. Controller 284 is also adapted to receive signals by way of references 270*a* and 274*a* from references 270 and 274, FIG. 5D, providing input signals to the controller when the door limit positions have been reached, respectively. An optional motor speed (rpm) input signal may be provided at terminal 273*a*, FIG. 5D, to the microcontroller 284. Microcontroller output references 306 and 308 are operably connected to references 306*a* and 308*a*, FIG. 5C, to provide signals to motor drive circuit transistors Q10 and Q9 to energize solenoid coils 214*a* and 212*a*, respectively. Interlock solenoid coils 228*a* and 230*a* assure that contact 228 and 230 are in positions to prevent the motor control relays 212 and 214 from being actuated simultaneously when the system is utilizing these relays.

Looking further at FIGS. 5C and 5E, the control system 201 includes a control circuit for energizing and deenergizing brake assembly 66 including a connector 320 for supplying 24 volt DC current to the brake assembly. The brake assembly 66 is energized to release by a signal at reference 322, FIG. 5D, output from the microcontroller 284, which is connected to schematic reference 322*a*, FIG. 5E to cause transistor Q7 to provide current in conductor 324 and to also cause transistor Q6 to conduct current to the connector 320. Indicator 326 is operable to illuminate when the brake assembly 66 is receiving current from control system 201. Motor control relay coils 212*a* and 214*a* and brake assembly 66 will not energize unless a motor control "watchdog" circuit comprising circuit U7A is active as will be explained further herein. A brake release feedback signal is also provided at conductor 328 and by way of a signal conditioning circuit 330, FIG. 5D, to signal in terminal no. 2 of microcontroller 284.

FIG. 5E also illustrates a connector 332 and signal conditioning circuits 334 and 336 for receiving a radio control signal and a motor speed signal, respectively. Radio control and motor speed signals from circuits 334 and 336 are conducted to microcontroller 284 by way of references 334*a* and 336*a* to references 334*b* and 273*a* on microcontroller 284, FIG. 5D.

Referring still further to FIGS. 5C and 5F, a motor interlock circuit is provided and may include an external normally closed switch across pins 8 and 9 of connector 300, or a short connection, as shown, between references 341*a* and 341. The motor interlock circuit also comprises a hoist interlock including switch 120 connected to connector 344, a connection between references 346 and 346*a*, FIG. 5B, the aforementioned motor thermal interlock and a connection between references 338*a* and 338. A visual indicator 337 operably connected to reference 338, FIG. 5B, indicates when a switch in the motor interlock circuit has opened to prevent further operation of the motor 48 and any associated fire risk. Still further, a circuit 340, FIG. 5C, includes visual indicators 342 and 343 for the aforementioned hoist interlock and another external interlock, if used, by way of connector 300, respectively. The hoist interlock, including switch 120, FIG. 4, indicates when the release block 108 is disengaged to allow manual operation of the door operator 30 and thus prevents motor operation during this condition. Power at 24 volts DC is furnished to the interlock circuit 340 by way of references 341, 341*a*, and the aforementioned external switch or short across connector 300, see FIG. 5F also. Switch contacts of switch 120 are open when the manual drive mechanism of operator unit 30 is operative, thus, removing power from motor control relay coils 212*a* and 214*a* by way of references 346, FIG. 5C, and 346*a*, FIG. 5B.

Referring to FIG. 5C, the aforementioned motor drive watchdog circuit is provided in control system 201 including the NPN transistor Q8 and monostable multivibrator U7A. When signals have been applied to operate motor 48 and release brake assembly 66, microcontroller 284 provides signal to circuit U7A which turns transistor Q8 "on". Accordingly, transistor Q8 enables both the circuits for the motor relay coils 212*a* and 214*a* as well as the brake release circuit to provide a suitable signal by way of connector 320 to energize the brake assembly 66. However, circuit U7A maintains the transistor Q8 on for a short period of time (milliseconds) and microcontroller 284 is required to send additional activation pulses to circuit U7A to maintain the transistor Q8 in the "on" state. Accordingly, the motor drive watchdog circuit is intended to be a device to minimize unintended brake release or motor energization in the event of failure of the microcontroller 284, for example.

Referring still further to FIG. 5C, a motor drive status feedback circuit is provided including optical coupler U8 and reference 348 which provides a feedback signal to reference 348*a*, FIG. 5D, to provide an input signal to the microcontroller 284. The drive status feedback circuit protects the microcontroller 284 from harmful transients and is connected in parallel with both of the relay coils 212*a* and 214*a* so that when these coils are energized an "active" signal is provided to microcontroller 284 and one or the other of visual indicators 351*a* or 351*b* is illuminated. If one or the other of the coils 212*a* and 214*a* cannot be energized due to a failure of the motor watchdog circuit, microcontroller 284 is operable to not provide output signals after a suitable time delay. If coils 212*a* or 214*a* cannot be energized due to one or more of the motor drive interlock inputs, an inactive or lack of signal is provided to the microcontroller 284. Under these conditions the microcontroller 284 is operable to not provide drive output signals to the coils 212*a* or 214*a*. Brake assembly 66 will be caused to reengage, after a suitable time delay, and proper error codes will be shown on a display to be explained in further detail herein. Still further, if the motor drive feedback circuit provides an "active" signal to microcontroller 284 when it should be "inactive" the microcontroller will store and display proper error codes and attempt to shut down the erroneous control outputs. Failing to correct such a situation, the microcontroller 284 will store the proper error code and then initiate an emergency shutdown by turning "on" transistor Q11, FIG. 5D. With transistor Q11 turned on a signal is provided via references 393 and 261, see FIG. 5A also, to SCR 262 to short circuit the 24 VDC power supply circuit and cause fuse 256 to open.

Figure 5G:
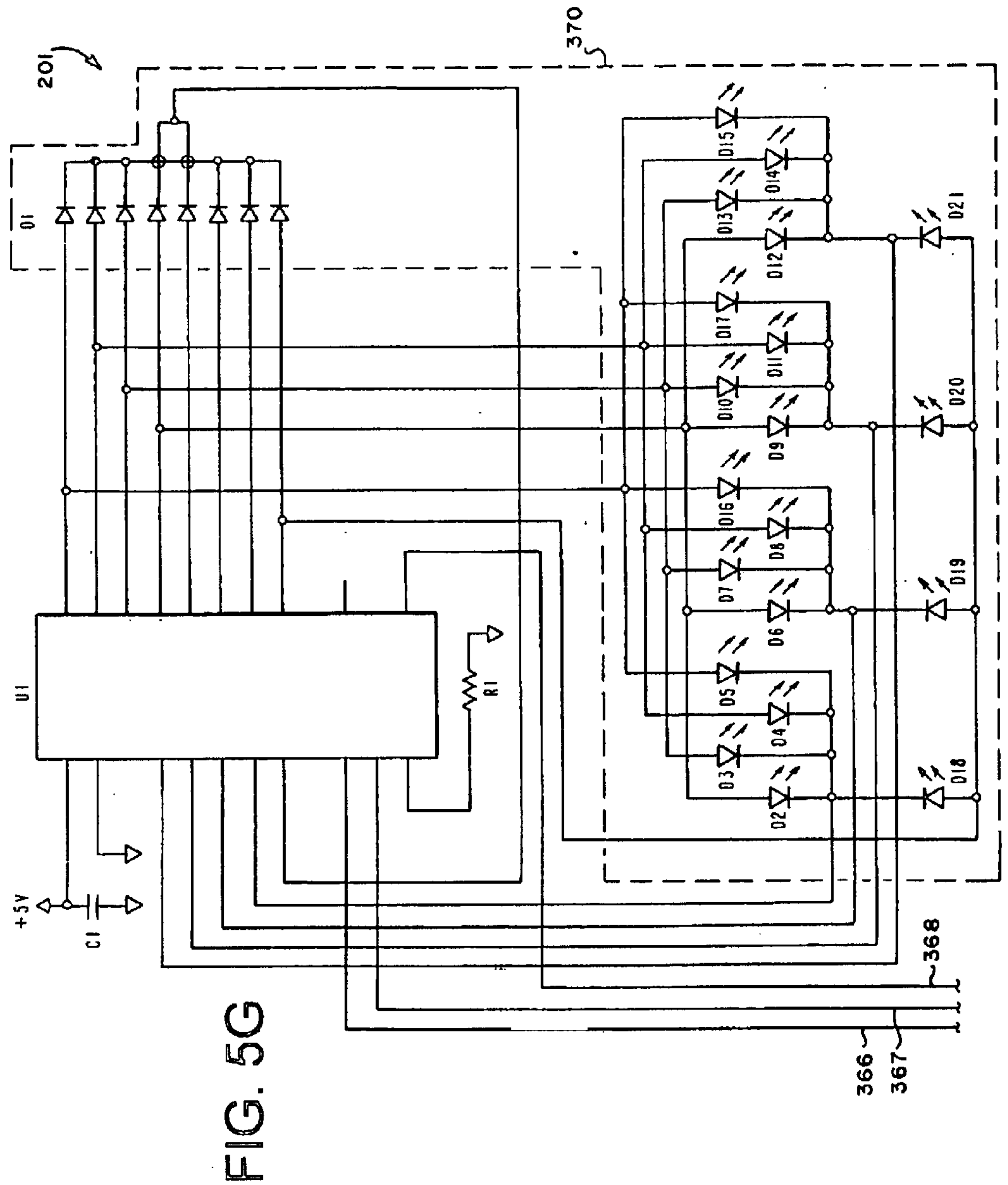

Referring now to FIGS. 5D, 5F AND 5G, the communications decoder circuit 288, as previously mentioned, is operable to provide output signals used to activate the motor drive watchdog circuit and a calibration keypad input circuit including a parallel-to-serial data converter circuit U3, FIG. 5F, by way of conductors 360 and 362. Data converter circuit U3 also communicates with microcontroller 284 by way of conductors 363 and 365. Data converter circuit U3 is connected to a keypad 366, including eight calibration keys for providing input to the microcontroller 284 by way of the data converter circuit. As shown in FIG. 5F, a CAL MODE key is used to enter and exit the control system calibration mode. The OPEN key is used to provide the same function as a signal at reference 294*c*. The CLOSE key is used to provide the same function as a signal at the close input reference 296*c*, except this key will not override an active reverse input signal to the microcontroller 284. The STOP key of keypad 366 provides the same function as a signal input at connector or flag 298*c*. The OPEN and CLOSE mode keys provide the open mode of operation of the control system 201 and the close mode of operation. A SCROLL key allows scrolling through the available calibration functions and a SET/CLEAR key sets or clears the highlighted calibration function. Decoder 288 enables a display driver circuit U1, FIG. 5G, by way of conductor 368. Simultaneously, microcontroller 284 provides data and clock signals via conductors 366 and 367. Display driver U1 is connected to a digital display circuit 370, FIG. 5G, disposed within housing 50 and viewable upon removing housing cover 50*c* during calibration or trouble shooting the control system.

The calibration mode of control system 201 described and shown is accessible when microcontroller 284 is waiting for a valid command. Activating and holding the CAL MODE key under these circumstances for a short period of time will effect operation of the microcontroller 284 to enter the calibration mode. The seven segment LED display will go blank and appropriate open and close mode indicators may be illuminated indicating a currently selected mode of operation. Any indicators associated with any previously selected calibration functions will also illuminate and a currently active calibration function indicator will blink. Activation of the open and close mode keys will cause the next indicator in the associated row to be highlighted indicating that this mode of operation is currently selected. Successive key depressions will repeat this operation, and will revert to the first mode of operation if no other options are available.

The SCROLL key will cause the next calibration function to be active and will illuminate an appropriate indicator in a blinking mode. Successive depressions of the SCROLL key will repeat this operation or will revert to the first function if no further options are available. The SET/CLEAR key will cause the active calibration function to be set or enabled if the function is not already set or enabled. However, when a limit overrun function is selected the 7-segment display 370 will illuminate indicating a current limit overrun index value and successive depressions of the SET/CLEAR key will increment this value from zero to nine, then roll over to zero again. A value of zero represents no limit overrun or an immediate stop when a corresponding limit switch signal is provided to the microcontroller. The values of one through nine of the limit overrun index value indicates progressively longer time delays between receipt of a limit signal from limit switch unit 264 and onset of braking procedure. A value of nine equates to approximately 540 milliseconds of time delay before onset of braking.

Braking rate or effecting operation of the brake assembly 66 to brake rotation of the motor output shaft, may be controlled and the seven segment display 370 will indicate a current braking rate index value. Successive depressions of the SET/CLEAR key will increment the value from zero to nine and then roll over to zero again. A value of zero represents no progressive braking and brake forces are applied in full immediately on timing out of the limit overrun in the given direction of door travel. A value of nine represents a minimum braking rate possible and provides the smoothest stop but the greatest amount of "coasting" of the door after receiving a limit signal and any appropriate limit overrun time delay.

The microcontroller 284 provides a nominal 24 VDC signal by way of transistor Q6 to release the brake assembly 66. Nominal brake operation is achieved by the microcontroller 284 effecting release or energizing the brake with the 24 VDC signal for a period of 250 milliseconds. This signal is pulse width modulated by applying a 24 VDC square wave signal at a rate of approximately 5 KHz with a duty cycle of approximately 50%. This operation continues until the microcontroller 284 initiates the braking procedure. During the braking procedure, the pulse width modulation frequency is reduced to 8 Hz and the duty cycle is reduced to a user selected value of between approximately 2% and 18%. Alternatively, immediate braking may be selected during the calibration mode. In this procedure the brake energizing or release signal is turned off immediately with no pulse width modulation. The purpose of the pulse width modulated braking procedure or progressive braking is to provide a smooth stop of the door 14, eliminate shock forces on the operator unit 30, reduce door operation sound level and enhance door life. At the end of the braking procedure the brake energization signal remains turned off and the microcontroller 284 enters a so called halt mode. The braking procedure may also be modified by continuing the 5 KHz pulse width modulation frequency and then the duty cycle is reduced in preset steps at time intervals set by the user in the calibration mode. The duty cycle is reduced over time to zero percent.

In another preferred operating method, brake release is initiated by applying the 24 VDC signal to the brake assembly 66 at a pulse width modulation frequency of about 5 KHz and an initial duty cycle of zero percent. This duty cycle is then increased in preset steps at a preset time interval. The time interval may be selected in the calibration mode and the duty cycle will increase to one hundred percent and remain there for 250 milliseconds. Then the duty cycle will be set to fifty percent. The purpose of such a procedure is to minimize shock loads experienced at the initiation of door movement and provide a smooth start which reduces door operation sound level and enhances door life. The above-mentioned pulse width modulation frequencies, duty cycles and time intervals may be selected in accordance with the particular motor, operator unit configuration and door configuration.

The control system 201 may also be provided with a mid-stop setting whereby the microcontroller 284 may be programmed to set a time delay associated with a mid-stop limit position. The mid-stop limit position of the door 14 is a preselected position of the bottom edge of the door in the upward or opening travel mode of the door at which the operator unit 30 will stop before reaching the "up" limit position sensed by limit switch unit 264. Thus, activating the control system 201 to open or move the door 14 to the up position when the door is at the down limit position will cause the door 14 to move up until the mid-stop time limit has elapsed. The microcontroller 284 will then effect shutoff of motor 48 to stop the door in the mid-stop position.

Activation of the up or open switch 294 or the OPEN key on keypad 366, when the door is in the mid-stop position, will cause the door to open until it reaches the up limit as determined by limit switch unit 264. In this way, particularly long or high doors may be partially opened when the entire door travel is not required. Setting the mid-stop limit using the calibration keypad 366 may be carried out by actuating the RUN UP or OPEN switch or key on the keypad when the door is at the down or closed limit position. The door 14 will then begin to open and a mid-stop timing function will begin counting. When the door has reached the desired level for the mid-stop position, the door is stopped by actuating either the stop switch 298 or the STOP key on keypad 366. The controller 284 will store the mid-stop timer value when the SET/CLEAR key is activated. Once the mid-stop position has been set, SET/CLEAR key actuations will clear the mid-stop timer and deselect that function. When the mid-stop timer function is deselected, further actuations of the SET/CLEAR key have no effect. The mid-stop timing function will not be set as described above if door "run-up" was not initiated from the down limit position of the door.

The control system 201 described and shown may also provide a maximum run timing function. This function may be cleared by actuating the SET/CLEAR key of keypad 366 to clear any maximum run timing value stored in the memory 287. The maximum run timing function is operable for both directions of travel thanks to the provision of two separate maximum run timers in microcontroller 284. If the operator unit 30 does not achieve the appropriate limit position to actuate either the up limit or down limit of the switch unit 264 then the time interval specified will cause the operator unit to shut off. If the operator unit 30 was operating in the door down or closing direction, it will also reverse the direction of movement of the door 14 and operate until the up limit position is achieved. The time value for the maximum run timing function in both the up and down mode is measured during a first complete run from each limit position to the opposing limit position and this time value is increased by adding a predetermined number of time intervals (seconds) or by adding a fixed percentage of the measured time (i.e., 10%). This resulting time interval is stored in memory 287 for each direction of travel and can only be cleared within the calibration mode as described above.

After an event of the operator unit 30 exceeding the maximum run time in either the up or down operating mode, an appropriate error code is stored and displayed by the display 370. Moreover, after a maximum run time has been exceeded, the microcontroller 284 will effect shutdown of the operator unit 30 and will require reset by removal and subsequent reapplication of power to the control system 201.

The control system 201 described and shown is also provided with a code recall function whereby the display 370 will, when this function is selected during the calibration mode, display the most recent error code stored in memory 287. Actuating the SET/CLEAR key of keypad 366 will cause the previous error code to be displayed. This process can be continued until all stored error codes have been displayed. The display 370 continually displays a condition code in the operating mode of the system and displays calibration information in the calibration mode. A specific code is assigned to each condition that the user enters into the system.

The control system 201 previously described will now be summarized. Those skilled in the art will appreciate that the microcontroller 284 may be programmed by one of skill in the art to perform the functions described and employing the circuitry described and illustrated in FIGS. 5A through 5G. A correlation table for substantially all of the circuit elements shown in the diagram of FIGS. 5A through 5G follows herein. The modular design of the control system 201 shown and described is advantageous and virtually all connections made in the assembly process may be accomplished by way of the plug-in connectors illustrated and described. The connections may enter the housing 50 through a cable entry port, not shown, adapted to restrain the cabling and permit the cable connections to be substantially sealed.

Moreover, the control system 201 shown and described may be remotely mounted from the operator unit 30 for installations wherein the size and location of the housing 50 presents a clearance problem. For example, all of the components of the control system 201 shown in FIGS. 5A through 5G, may be mounted within the housing 50 and the housing 50 remotely mounted from the operator unit 30 whereby appropriate cabling may be provided for conducting signals between the operator unit and the control system 201 by way of one of the four connectors 202, 204, 206 or 208, and connectors 266, 320 and 344. In this way the control system 201, shown in FIGS. 5A through 5G, may be located in virtually any desired position remote from the operator unit 30. As mentioned previously, the range of applications of the control system for controlling an operator, such as the operator unit 30, is enhanced by the arrangement of the motor power conductor and control conductor connectors and contactor arrangements, as illustrated in FIG. 5B, and which is provided as part of a single board or control unit substrate which may be mounted in the housing 50.

Accordingly, as previously mentioned, the housing 50 may be disconnected from the remainder of the operator unit shown in FIGS. 2 and 3, for example, and mounted at a remote site. Each of the connectors 266, 320 and 344, as well as the selected one of the four connectors 202, 204, 206 or 208 is of a configuration unlike any of the other connectors. Thus, an intermediate section of bundled cable, for example, with appropriate connector members at each end may be interposed the housing 50 and the remainder of the operator unit and connections made to the motor 48 via one of connectors 202, 204, 206 or 208, the limit indicators or switch unit 264 on the operator unit 30 via the connector 266, the brake assembly 66 via the connector 320 and the hoist interlock switch 120 on the operator unit via the connector 344. Since each of these connectors is of a different configuration, the chances of an improper connection between the control system 201 and the motor and other components described above is substantially eliminated. Suitable cable entry ports may be provided in the housing 50, not shown, to provide for interconnection between the control system 201 and the hoist interlock, the limit indicators, the motor 48 and the brake assembly 66.

The control system 201 is advantageously protected against power supply transient signals conditions by the circuitry illustrated in FIG. 5A and including the voltage overprotection circuit. The 24 VDC power supply circuit and 5 VDC power supply circuit for controlling the logic circuits is advantageously arranged as shown in FIG. 5A.

The wall-mounted control unit or box 200 is advantageously provided with the one button input type switch 278, alone or together with the push button switches 294, 296 and 298. Each switch will cause the operator unit 30 to be controlled to open or close the door 14 from a momentary activation. Alternatively, the microcontroller 284 may be programmed through the calibration input keypad 366, as described, to require constant contact or engagement of the switches 278, 294, 296. The microcontroller 284 is programmable to operate such that if the switch 296 to close the door or the CLOSE key of keypad 366 is engaged when in the constant contact mode and then released, the operator unit 30 will reverse direction and run the door 14 to the "up" limit position. If switch 278 is utilized, this switch may operate in the constant contact or momentary contact mode of operation and a stop input signal or a keypad signal causes a moving door to stop by deenergizing the motor 48 and beginning the braking procedure immediately. Control signals may be transmitted to the control system 201 by way of the circuit 334 from a remote radio transmitter. However, control signals from a remote radio transmitter may be initiated only by momentary contact of a control switch on the transmitter to perform the same functions as the switch 278 performs when operating in the momentary contact mode.

Further, the microcontroller 284 is programmable to operate in such a manner that when the switch 296 is actuated, such action can override a door reverse input signal if the switch remains engaged until the door reaches the down limit position as sensed by the limit switch unit 264. In this way, a defective door bottom edge sensor or obstruction detector may be overridden.

Still further, the microcontroller 284 is programmable to enter the so-called halt mode during which the microcontroller will not respond to any commands. The halt mode may be run for a preset period of time such as approximately 0.25 seconds to 5.0 seconds. This halt timer interval may be set with the microcontroller 284 in the calibration mode, if desired. After the halt mode time delay has elapsed, the microcontroller 284 is then operable to accept another command. One purpose of the halt mode is to reduce shock loads experienced by the operator unit 30 during door operation such as in rapid reversal of the direction of movement of the door.

The microcontroller 284 is also programmed to deenergize motor 48 and apply brake 66 to the motor output shaft immediately upon receipt of a signal at reference 302*c* and the associated circuit 302*a* which is operable to receive a signal from an external safety device, such as a door bottom edge sensor and/or an obstruction detector, or other controllers or devices, not shown. Upon receipt of a signal from circuit 302*a*, the microcontroller enters the halt mode and after lapse of the halt mode time delay, the motor 48 is energized to move the door 14 to the up or open limit position or other defined limit or safety position. Moreover, an active signal from circuit 302*a* will not permit the controller to operate the motor 48 to close the door unless overridden, as mentioned previously.

The motor interlock circuits will prevent operation of the operator unit 30 without any intervention from the microcontroller 284. However, in order to perform error diagnosis, the indicators 337, 342 and 343 will advise an operator if one of the interlocks has refused to allow the motor 48 to operate. In this regard also, an indicator 335*a*, FIG. 5F, is provided to indicate when 24 VDC power is being furnished to the control system 201.

The control system 201 is advantageously provided with a radio control input signal circuit as previously described and shown on FIG. 5F. Connector 332 is adapted to be connected to a radio receiver, not shown, and to receive a signal at circuit 334 to operate the microcontroller 284 in the same manner that the one button switch 278 may sequentially operate the controller to move the door 14 between open and closed positions. The circuit of the control system 201 illustrated in FIGS. 5A through 5G also advantageously includes a 24 VDC power supply available through the connector 332 to power the aforementioned radio receiver. Connector 332 is also available to receive a motor speed signal from a suitable motor speed sensor, not shown, which preferably would be a nominal square wave signal with a frequency directly proportional to the rotational speed of the motor output shaft for the motor 48 or the output shaft 34 of the operator unit 30. An "rpm" or speed signal may be used to detect a stalled motor, a broken drive train, unintentional door movement, output shaft overspeed or contact between the door and an obstacle in its path, for example.

Preferred modes of operating the brake assembly 66 to release and allow rotation of the motor output shaft 48 and to progressively brake operation of the operator unit 30 have been previously described. Moreover, the brake operating feedback signal provided via conductor 328 and the signal conditioning circuit 330 is advantageous to permit the microcontroller 284 to indicate an appropriate error code and also initiate an emergency shutdown of the control system by outputting an appropriate signal via controller pin RB7, FIG. 5D, and transistor Q11 which provides a signal at schematic reference 393, which in turn, provides a signal to the over-voltage sensing circuit 260 by way of schematic reference 261, FIG. 5A, to effect opening of fuse 256. This action removes all power from control system 201, motor 48 and brake assembly 66 and applies brake assembly 66 to stop rotation of shaft 34. An output signal on pin RB7 of microcontroller 284 may also be provided during other emergency shutdown conditions described above to effect the same action just described with regard to opening fuse 256.

Another advantageous feature of the control system 201 is the motor interlock circuit and motor watchdog circuit illustrated in FIG. 5C will turn on transistor Q8 if an appropriate signal is provided to the one shot multi-vibrator U7A from microcontroller 284 by way of decoder 288 at references 288*d*–288*e*. Transistor Q8 when turned "on" will, in turn, allow transistors Q9 or Q10, depending on which has been furnished a signal by way of references 308*a* and 306*a* from the microcontroller 284. Transistors Q6 and Q7 are also allowed to turn on via a signal on conductor 324. Transistor Q8 is turned on for intervals of eleven milliseconds by the microcontroller 284 operating through the decoder circuit 288. If the signal is not continuously furnished through the mono-stable multi-vibrator U7A, transistor Q8 will turn off thereby turning off transistors Q9 or Q10 and Q6 and Q7 deenergizing motor 48 by deenergizing either the relay actuator 212*a* or 214*a* and brake assembly 66 via the circuit shown in FIG. 5E. Moreover, the interlock relays 228, 228*a* and 230, 230*a* insure that the motor control relays cannot be energized at the same time. If the microcontroller 284 has given a proper command to energize motor 48 in one direction or the other and the proper voltage is not applied across the relay coils 212*a* or 214*a*, then an inactive signal is present at reference 348, the microcontroller 284 will initiate a braking procedure and display and store appropriate error codes. This action will also take place if watchdog circuit, including circuit U7A, or transistors Q9 or Q10, is not operating properly or if motor interlock circuits are open.

The operation of the control system 201 shown in FIGS. 5A through 5G and described herein is believed to be understandable to those of skill in the art from the foregoing description. Moreover, the construction of the control circuit is also believed to be understandable to those of skill in the art based on the description, the drawing illustrations and the following correlation table. This is a correlation table of alphanumeric designations shown in the drawings hereof, their descriptions, and examples of commercially available components designated.

| Designation | Description | Manufacturer | Manufacturer's P/N |
|---|---|---|---|
| C1, 3–6, 10, 11, 22 | Capacitor, .1 uF 50 V Mono | | |
| C8 | Capacitor, 3300 uF, 50 v electrolytic | | |
| C12 | Capacitor, .33 uF 50 V Mono | | |
| C2, 13, 14, 16–18, 24, 32, 58, 60, 62, 73 | Capacitor, .01 uF 50 V Disk | | |
| C23 | Capacitor, .033 uF Film | | |
| C26–C30 | Capacitor, .01 uF, | | |
| C46, 47, 50, 51, 53, 55, 57, 59, 61, 71 | Capacitor, .001 uF 50 V Disk | | |
| C68, 69 | Capacitor, .001 uF 500 V Disk | | |

-continued

| Designation | Description | Manufacturer | Manufacturer's P/N |
|---|---|---|---|
| C7, 15, 19–21, 25, 31, 41, 45, 48, 49, 52, 54, 56, 65, 66, 70 | Capacitor, .01 uF 500 V Disk | | |
| C9 | Capacitor, 22 uF 50 V Elec | | |
| D1 | Display, 7-segment | Kingbrite | SC05-11HWA |
| D22–25 | Diode, 1N5402 | GI | |
| D26–34, 44 | Diode, 1N4002 | | |
| D3–21, 35–39, 42, 43 | LED, T1, Green | Kingbrite | L132XGD-TGC |
| F1 | Fuse | Bussman | AGC-2 |
| F1, 2 | Fuse Clip | Keystone | 3513 |
| F2 | Fuse | Bussman | AGC-3/10 |
| | Jumper | Buchanan | J74 |
| J1 | Header, 13-pin .1 spaced | Amp | 1-103639-2 |
| J11 | Header, 3-pin SL-156 | Amp | 644753-3 |
| J2 | Terminal block, barrier type, 3-pole | Buchanan | SSB7FM030202 |
| J3 | Header, 5-pin Multimate | Amp | 640900-1 |
| J4 | Header, 4-pin SL-156 | Amp | 644753-4 |
| J5 | Terminal block, 9-pole | Buchanan | 6PCV09 |
| J6, 12 | Header, 12-pin Multimate | Amp | 350713-1 * |
| J7 | Header, 7-pin SL-156 | Amp | 644753-7 |
| J8 | Header, 2-pin SL-156 | Amp | 644753-2 |
| J9, 10 | Header, 12-pin Multimate | Amp | 350713-1 * |
| K1, 3 | Relay, power | Song Chuan | 735-3A-CT-24VDC (73572) |
| K2, 4 | Relay, interlock | | |
| MOV1–4 | MOV | Maida | D6521ZOV350RA3 5 |
| MOV5–10 | MOV | Maida | D65ZOV681RA260 |
| Q1, 3–5, 7–12 | Transistor, MPSA05 | Samsung | |
| Q13 | Transistor, MPSA55 | Samsung | |
| Q2 | Transistor, TIP47 or TIP50 | Motorola, et al. | |
| Q6 | Transistor, TIP107 | Motorola, et al. | |
| R1, 17, 75, 91, 92 | Resistor, 1.2 K 1/4 W 5% | SEI | |
| R80–R84 | Resistor 100 ohms | | |
| R104 | Resistor, 3.3 K 1/4 W 5% | SEI | |
| R105, 106 | Resistor, 0 1/4 W | SEI | CD1/4 ZERO TR |
| R107 | Resistor, 1.5 K 1/4 W 5% | SEI | |
| R14 | Resistor, 2.2 K 1/4 W 5% | SEI | |
| R16, 53–55, 60, 70, 72, 87 | Resistor, 22 K 1/4 W 5% | SEI | |
| R18, 58, 76–79 | Resistor, 5.1 K 1/2 W Mini 5% | SEI | |
| R19–26, 28, 37, 39, 42, 43, 46, 47, | Resistor, 4.7 K 1/4 W 5% | SEI | |

-continued

| Designation | Description | Manufacturer | Manufacturer's P/N |
|---|---|---|---|
| 50, 51, 56, 61, 86, 89, 96–103 | | | |
| R2, 13, 15 | Resistor, 1 K 1/4 W 5% | SEI | |
| R27 | Resistor, 1 K 1/2 W 5% | SEI | |
| R29–35, 63, 67, 74, 93 | Resistor, 10 K 1/4 W 5% | SEI | |
| R3–12 | Resistor, 220 1/4 W 5% | SEI | |
| R36, 38, 40, 57 | Resistor, 7.5 K 1/4 W 5% | SEI | |
| R41, 45, 49, 88 | Resistor, 8.2 K 1/4 W 5% | SEI | |
| R44, 48, 52, 90 | Resistor, 3.9 K 1/2 W 5% | SEI | |
| R59 | Resistor, 750 1/4 W 5% | SEI | |
| R62 | Resistor, 560 3 W Mini 5% | SEI | |
| R64 | Resistor, 18 K 1/4 W 5% | SEI | |
| R65 | Resistor, 100 K 1/4 W 5% | SEI | |
| R66, 69, 71, 94 | Resistor, 240 1/4 W 5% | SEI | |
| R68 | Resistor, 470 K 1/4 W 5% | SEI | |
| R73 | Resistor, 1.8 K 1/4 W 5% | SEI | |
| R85 | Resistor, 3.9 K 1/4 W 5% | SEI | |
| R95 | Resistor, 5.6 1 W 10% | Ohmite | OX56GK |
| SC1 | SCR, MCR12N | Motorola, et al. | |
| U1 | IC, MC14489P | Motorola | |
| U2 | IC, 74HC42 | Harris, et al. | |
| U3 | IC, 74HC589 | Fairchild, et al. | |
| U4 | IC, 93LC46B-I/P | | |
| U5 | PIC16C73B-20 I/SP | Microchip | |
| U6 | Voltage Regulator, 7805BT | Motorola, et al. | MC7805BT |
| U7 | IC, 74HC4538AN | Motorola et al. | |
| U8 | Opto coupler, LTV4N37 | Lite-on | |
| Y1 | Ceramic Resonator, 10 MHz | U.S. Electronics | ZTT10.00MTA |
| Z1–12, 15–21, 23 | Diode, Zener, 1N5231B | | |
| Z13, 22, 25–29 | Transzorb, P6KE47 | HTA, GI | |
| Z14 | Diode, Zener, 1N5252B | | |
| Z24 | Diode, Zener, 1N5261B | Motorola | |

Although preferred embodiments of the invention have been described in detail, those skilled in the art will recognize that various substitutions and modifications may be made without departing from the scope and spirit of the appended claims.

What is claimed is:

1. A control system for controlling the operation of a door operator unit to move a door between open and closed positions, said operator unit including an electric drive motor, a drive unit interconnecting said drive motor with a door, and an electrically operated brake assembly operably connected to at least one of said drive motor and said drive unit for braking rotation of an output shaft of said drive unit, said control system comprising:

a programmable controller operable to receive door open, door close and door stop signals and to provide control signals to said drive motor;

a brake control circuit operably connected to said controller and operable to control engagement and release of said brake; and a keypad operably connected to said controller for providing calibration of a selected function controlled by said controller including at least one of a braking rate for applying braking action by said brake assembly to control rotation of said output shaft, a setting for arresting movement of said door between its open and closed positions, a maximum run time of said operator unit to provide at least one of opening and closing said door, and deenergizing said drive motor for a predetermined time commencing with deenergization of said drive motor.

2. The control system set forth in claim 1 including:

a visual display operably connected to said controller for displaying a selected condition code in an operating mode of said control system and calibration information when said control system is in a calibration mode.

3. The control system set forth in claim 2 including:

a memory operably connected to said controller and operable to store signals related to multiple error codes for recall and display on said visual display.

4. The control system set forth in claim 1 wherein:

said controller includes a timer for automatically setting a maximum run time of said operator unit between open and closed positions of said door based at least on a measured run time of said door between said open and closed positions.

5. A control system for controlling the operation of a door operator unit to move a door between open and closed positions, said operator unit including an electric drive motor, a drive unit interconnecting said motor with a door, and an electrically operated brake assembly operably connected to at least one of said drive motor and said drive unit for braking rotation of an output shaft of said drive unit, said brake assembly including an electric actuator for engaging and disengaging a brake member, said control system comprising:

a controller operable to provide door open, door close and door stop signals;

a motor drive circuit adapted to receive control signals from said controller to effect operation of said drive motor to provide for one of opening and closing said door;

a brake control circuit operably connected to said controller and operable to provide signals to said brake actuator for at least one of releasing said brake member and for actuating said brake member to provide controlled rotation of said output shaft; and a motor drive status feedback circuit operably connected to said motor drive circuit and operable to receive a signal from said motor drive circuit when one or the other of plural motor drive relay actuators and an associated motor interlock relay are energized to provide a feedback signal to said controller.

6. The control system set forth in claim 5 including:

a motor watchdog circuit operably connected to said motor drive circuit and including a switch connected to said motor drive circuit and to means for receiving a signal from said controller, said means being operable in response to not receiving a signal from said controller to effect shutdown of said drive motor.

7. The control system set forth in claim 5 wherein:

said motor watchdog circuit is operably connected to said brake control circuit to prevent release of said brake member when said controller is inoperative.

8. A control system for controlling the operation of a door operator unit to move a door between open and closed positions, said operator unit including an electric drive motor, a drive unit interconnecting said drive motor with a door, and an electrically operated brake assembly operably connected to at least one of said drive motor and said drive unit for braking rotation of an output shaft of said drive unit, said brake assembly including an electric actuator for engaging and disengaging a brake member, said control system comprising:

a controller operable to provide door open, door close and door stop signals;

a motor drive circuit adapted to receive control signals from said controller to effect operation of said drive motor to provide for one of opening and closing said door;

a brake control circuit operably connected to said controller and operable to provide signals to said brake actuator for at least one of releasing said brake member and for actuating said brake member to provide controlled rotation of said output shaft; and a brake release feedback circuit operably connected between said brake control circuit and said controller for providing a brake status feedback signal to said controller.

9. The control system set forth in claim 8 wherein:

one of said controller and said brake control circuit include circuit elements operable to provide a pulse signal to said brake assembly to provide said controlled rotation of said output shaft.

10. A control system for controlling the operation of a door operator unit to move a door between open and closed positions, said operator unit including an electric drive motor, a drive unit interconnecting said drive motor with a door, and an electrically operated brake assembly operably connected to at least one of said drive motor and said drive unit for braking rotation of an output shaft of said drive unit, said brake assembly including an electric actuator for engaging and disengaging a brake member, said control system comprising:

a controller operable to provide door open, door close and door stop signals;

a motor drive circuit adapted to receive control signals from said controller to effect operation of said drive motor to provide for one of opening and closing said door;

a brake control circuit operably connected to said controller and operable to provide signals to said brake actuator for at least one of releasing said brake member and for actuating said brake member to provide controlled rotation of said output shaft; and a keypad operably connected to said controller and to a decoder circuit by way of a keypad driver circuit for providing calibration of a selected function controlled by said controller including at least one of a door limit position overrun time delay, a progressive braking rate for applying braking action by said brake assembly to stop rotation of said output shaft, a mid-stop setting for arresting movement of said door between its open and closed positions, a maximum run time of said operator unit to at least one of open and close said door, and deenergizing said drive motor for a predetermined time commencing with deenergization of said drive motor.

11. The control system set forth in claim 10 wherein:

said control system is mounted in an enclosure and is operably connected to said drive motor, said drive unit and said brake assembly by connector means whereby said enclosure may be selectively mounted on said operator unit and remote from said operator unit.

* * * * *